United States Patent
Wu (10) Patent No.: US 9,718,716 B2
(45) Date of Patent: Aug. 1, 2017

(54) SLUDGE TREATMENT SYSTEM

(71) Applicant: NANJING DELEI SCIENCE & TECHNOLOGY CO., LTD., Jiangsu (CN)

(72) Inventor: Hao Wu, Nanjing (CN)

(73) Assignee: NANJING DELEI SCIENCE & TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 15/101,763

(22) PCT Filed: Apr. 29, 2014

(86) PCT No.: PCT/CN2014/076433
§ 371 (c)(1),
(2) Date: Jun. 3, 2016

(87) PCT Pub. No.: WO2015/081658
PCT Pub. Date: Jun. 11, 2015

(65) Prior Publication Data
US 2016/0304380 A1    Oct. 20, 2016

(30) Foreign Application Priority Data
Dec. 3, 2013   (CN) .......................... 2013 1 0645801

(51) Int. Cl.
*C02F 11/06*      (2006.01)
*C02F 9/00*       (2006.01)
(Continued)

(52) U.S. Cl.
CPC ................ *C02F 11/06* (2013.01); *C02F 9/00* (2013.01); *C02F 11/02* (2013.01); *C02F 11/122* (2013.01);
(Continued)

(58) Field of Classification Search
CPC .. C02F 11/06; C02F 11/02; C02F 9/00; C02F 11/14; C02F 11/122
(Continued)

(56) References Cited

FOREIGN PATENT DOCUMENTS

CN    102617004 A    8/2012
CN    202415337 U    9/2012
(Continued)

OTHER PUBLICATIONS

First Office Action issued Sep. 2, 2014, by the State Intellectual Property Office of the People's Republic of China in related Chinese Patent Application No. 201310645801.9, with English translation (10 pages).
(Continued)

*Primary Examiner* — Edward Johnson
(74) *Attorney, Agent, or Firm* — Osha Liang LLP (57) ABSTRACT

A sludge treatment system, comprising a pump (1), an ozone generation device, an ejector (2) and pipe reactors (3). The pump (1), the ozone generation device, the ejector (2) and the pipe reactors (3) are sequentially connected by pipes. An oxygen generator (4) and an ozone machine (5) are arranged within the ozone generation device, and are connected by a pipe. The ozone generation device is used for providing ozone into the pipe reactors (3). The inner surfaces of the pipe reactors (3) are coated with a catalyst layer used for increasing the oxidative capacity of the ozone on the sludge. Spiral fin plates (6) allowing a fluid to generate a spiral flow are arranged within the pipe reactors (3). Also disclosed is a sludge treatment method using the present sludge treatment system. The present system has a high ozone utilization rate, and a low ozone input proportion.

14 Claims, 2 Drawing Sheets

(51) Int. Cl.
  *C02F 11/02* (2006.01)
  *C02F 11/12* (2006.01)
  *C02F 11/14* (2006.01)
  *C02F 1/00* (2006.01)
  *C02F 1/78* (2006.01)

(52) U.S. Cl.
  CPC .............. *C02F 11/14* (2013.01); *C02F 1/004* (2013.01); *C02F 1/78* (2013.01); *C02F 2201/782* (2013.01); *C02F 2203/006* (2013.01); *C02F 2209/38* (2013.01); *C02F 2303/02* (2013.01); *C02F 2303/10* (2013.01); *Y02W 10/30* (2015.05)

(58) Field of Classification Search
  USPC .......................................................... 588/301
  See application file for complete search history.

(56) References Cited

FOREIGN PATENT DOCUMENTS

| | | |
|---|---|---|
| CN | 103058480 A | 4/2013 |
| CN | 103663895 A | 3/2014 |
| CN | 203602470 U | 5/2014 |
| JP | 2008018309 A | 1/2008 |

OTHER PUBLICATIONS

Notification to Grant Patent Right for Invention issued Apr. 1, 2015, by the State Intellectual Property Office of the People's Republic of China in related Chinese Patent Application No. 201310645801.9, with English translation (3 pages).
International Search Report issued in PCT/CN2014/076433 mailed on Sep. 12, 2014 (2 pages).

SLUDGE TREATMENT SYSTEM

CROSS REFERENCE TO RELATED APPLICATIONS

This is a national stage application of PCT/CN2014/076433, filed on Apr. 29, 2014, which claims the priority of Chinese Patent Application No. 201310645801.9, filed on Dec. 3,2013. This application claims the benefit and priority of these prior applications and incorporates their disclosures by reference in their entirety.

BACKGROUND OF THE INVENTION

Technical Field

The present invention relates to the technical field of sludge disposal, in particular to a sludge disposal system and a method thereof.

Description of Related Art

Biological activated sludge process is the most common and mature sludge disposal technology, which has low cost in investment and operation and has a stable disposal effect. However, the biological activated sludge process has a problem, namely generating a great amount of sludge residue. The transport and disposal fees of the sludge residue take a large proportion in the total operation cost, and the disposal is limited by various conditions. At present, the disposal amount of domestic urban sludge is about 30 billion $m^3/a$, generating about 0.2 billion $m^3/a$ of biochemical sludge with a moisture content of 98%. The yield of the sludge residue is increased by 15% each year. The annual water-contained sludge yield of a 10 million t/a oil refinery is about 10,000 ton.

Biochemical sludge residue mainly contains water, microorganisms, microbial metabolites and organic solids. Biochemical sludge residue is harmful to the environment because it has a great amount of microorganisms, viruses, parasites, organics, nitrogen and phosphorus, and odors. The biochemical sludge is voluminous because of high water content. The contained water includes free water, interstitial water, surface water and bound water. The primary cause is that the sludge has macromolecular organics with special properties. Those macromolecular organics lead to the existence of the interstitial water, surface water and bound water. The free water accounts for about 70% of the total water content, and is not attached to or bound with the sludge, thus is easy to separate, and can be separated by gravity. The water due to the effect of capillaries is difficult to separate, and needs to be separated by centrifugation or vacuuming. The surface water is bound with glue surfaces through hydrogen bonds, thus is difficult to separate and can be only separated by mechanical means after being processed. The bound water is bound with the sludge through chemical bonds, accounting for about 4% of the total water content. The bound water is very difficult to separate by common physical and chemical methods, and is a main ingredient of dehydrogenated sludge. Internal water is the water in cells, which is small in volume, but more difficult to remove.

Disposal methods of the sludge residue include landfill, soil improvement and dry-burning. The sludge residue may include a great amount of heavy metals, pathogenic microorganisms and persistently non-biodegradable organic contaminants. Soil improvement has been forbidden in some countries, while landfill and dry-burning disposal also face limits due to the increasingly insufficient land resources and strict environmental laws and regulations.

Existing biochemical sludge disposal processes include the following. Dehydrogenation: The water content is usually reduced to 80%-84%; a great amount of sludge residue still exists; and the amount of the contaminants is not reduced. Burning: Reduction is desirable, but there are problems of high cost of investment and operation, complicated operation, generation of ashes, and difficulties in smog disposal. Digestion is low in disposal cost, but only a part of the organics can be removed, and the reduction of sludge is undesirable.

At present, the main indicator of sludge reduction is the water content of the sludge cakes and total yield of sludge cakes. The water content of the sludge cakes is tested according to the national standard. Ozone aeration oxidation is to introduce high-concentration ozone into a reactor. Due to the strong oxidation of the ozone, the cell walls and cell membranes of the microorganisms in the sludge are smashed, and a great amount of organic matter is released from the cells. Therefore, this method can be used to reduce the sludge and kill harmful organisms in the sludge. Usually, the ratio of the ozone dose to the sludge amount is 0.015-0.3 kg ozone/kg sludge amount. According to Japanese literature, the ratio of the ozone dose to the converted 100% sludge amount is 0.015 kg/kg sludge amount. According to studies made by domestic universities, the ratio is 0.05-0.35 kg/kg sludge amount. Usually, the ozone and the sludge contact each other in a contactor. The ozone with such a high dose can exist in the lab stage, but is rarely achieved in the industrial stage.

For a sludge disposal factory with a daily sludge cake of 40 ton, the converted 100% sludge amount is 8,000 kg each day if calculated on the basis of 80% water content of the sludge cake, a 16.67 kg/h ozone generator is required if calculated on the basis of 0.05 kg ozone/kg sludge amount, and a 116.7 kg ozone generator is required if calculated on the basis of 0.35 kg ozone/kg sludge amount. At present, a power of 15-21 KWh is required for every 1 kg of ozone according to domestic and overseas indexes, and 8 KWh power consumption is needed even if industrial oxygen is used as a raw material to replace air. A 16 kg/h ozone generator itself has power consumption of 240-336 KWh. The equipment investment, power system configuration and operation cost are essential factors that the sludge disposal property owner must consider.

Therefore, the sludge disposal system for disposal of sludge in the prior art has the following defects: short pause time of ozone in the reactor, insufficient contact between sludge and ozone, low ozone utilization rate, high ozone dose, high power consumption, high operation cost, and difficulties in large scale promotion and application.

BRIEF SUMMARY OF THE INVENTION

The objective of the present invention is to provide a sludge disposal system and method for ensuring long pause time of the ozone in the reactor, sufficient contact between the sludge and the ozone, high ozone utilization rate, low ozone dose and low operation cost.

To solve the above technical problems, the present invention provides a technical solution of a sludge disposal system. The sludge disposal system includes a pump, ozone generators, a jet device and pipe reactors, which are connected in turn through pipes, wherein the ozone generator is used for feeding ozone to the pipe reactors to realize sufficient contact between ozone and sludge.

Further, the ozone generator is internally provided with an oxygen making machine and an ozone machine which are connected though pipes;

the number of the pipe reactors is two or more, while the pipe reactors are connected in parallel or in series through pipes;

the inner surfaces of the pipe reactors are coated with a catalyst layer for improving oxidation of sludge by ozone;

the lower parts of the pipe reactors are provided with sludge inlets, and the upper parts of the pipe reactors are provided with sludge outlets.

Further, the diameters D of the pipe reactors are 32 mm≤D≤500 mm, and the lengths L are 0.2 m≤L≤10 m.

Further, the pipe reactors are internally provided with spiral fin plates which drive fluid to generate spiral motion; the diameters D of the pipe reactors are 100 mm≤D≤350 mm, and the length L are 0.3 m≤L≤3 m.

Further, the diameters D of the pipe reactors are 200 mm, and the lengths L are 1.5 m.

Further, the jet device is a Venturi mixer.

Further, the pipe connecting the ozone generator and the pipe reactor is provided with a gas flow meter, and the inlet end of the pump is provided with a basket filter.

Further, the pump, ozone generator, jet device and pipe reactors are integrally installed in a case; one or more cases are provided, connected in series through pipes.

A sludge disposal method of the sludge disposal system of the present invention includes the following steps:

(1) Sludge water to be disposed is conveyed to the jet device through the pump at a certain speed; the jet device generates a negative pressure to absorb ozone generated by the ozone generator to form a mixture of ozone and sludge.

(2) The mixture enters the pipe reactors through pipes; the mixtures sufficiently contact with the catalyst layers in the pipe reactors to perform a redox reaction when catalyzed by catalyst.

(3) Sludge in the redox reaction product is exhausted via the sludge outlets of the pipe reactors.

Further, the pause time of the mixture in the pipe reactors is 10 s-300 s, and the amount of ozone absorbed into the jet device is adjusted through the flow of the pump and a valve on the pipe.

Beneficial effects: The system of the present invention operates stably, has high reliability, and simple and feasible. The present invention has the following advantages:

(1) The present invention fulfills the objective of reducing sludge by using an extremely low ozone dose of 0.00197-0.00475 kg/kg sludge amount. In a sludge disposal plant with a daily sludge cake of 40 ton, an ozone amount of 0.6567 kg-1.583 kg/h can realize reduction of sludge, and one 1-2 kg/h ozone generator configured can meet technical requirements.

(2) The inner structure of the pipe reactors drives the fluid to generate a spiral motion such that the sludge fully contacts with ozone, and the pipe reactors are internally coated with a catalyst, thus further improving the oxidation efficiency of ozone.

(3) The present invention realizes modular production of the sludge-reduction disposal system. The present invention does not need modification on the current sludge system, and the installation and operation of the sludge-reduction disposal system can be executed without shutdown. The present invention does not affect the original continuous sludge concentration and dehydrogenation. The present invention eliminates odors generated in the sludge disposal system and during export of the sludge cakes, lowers the water content of the sludge cakes, reduces dose of flocculant, lowers energy consumption during production, and reduces the total sludge amount discharged from the system.

BRIEF DESCRIPTION OF THE SEVERAL VIEWS OF THE DRAWINGS

Wherein: 1. pump; 2. jet device; 3. pipe reactor; 4. oxygen making machine; 5. ozone machine; 6. spiral fin plate; 7. sludge concentration basin; L. length of the pipe reactor; D. diameter of the pipe reactor.

DETAILED DESCRIPTION OF THE INVENTION

In order to describe the technical solution and technical objective of the present invention, the present invention is further described with reference to the drawings and specific embodiments.

Embodiment 1

Figure 1:
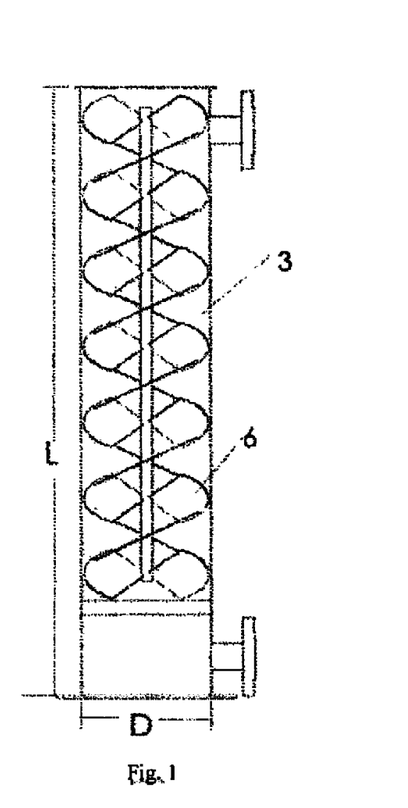
FIG. 1 is a schematic view of a pipe reactor of the present invention.
Figure 2:
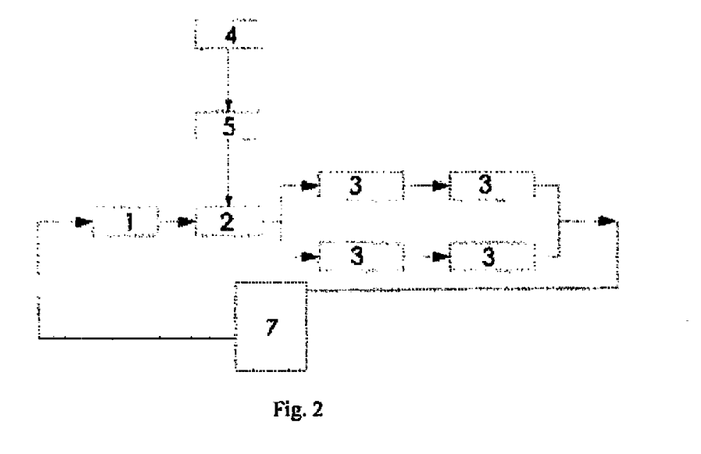
FIG. 2 is a flowchart of a sludge disposal system of the present invention.

As shown in FIG. 1 and FIG. 2, the present invention provides a technical solution of a sludge disposal system, characterized in that, the sludge disposal system includes a pump 1 with a flow of 8 m$^3$/h, ozone generators, a jet device 2 and pipe reactors 3, which are connected in turn through pipes, wherein the ozone generator is used for feeding ozone to the pipe reactors 3 to realize sufficient contact between ozone and sludge.

The jet device 2 is a Venturi mixer. The ozone generator is internally provided with a 60 L/min oxygen making machine 4 and a 240 g/h ozone machine 5 which are connected though pipes.

The number of the pipe reactors 3 is four, while the pipe reactors 3 are connected in parallel or in series through pipes.

The inner surfaces of the pipe reactors 3 are coated with catalysts capable of catalyzing ozone into hydroxyl radicals, further improving the oxidation efficiency of ozone.

The lower parts of the pipe reactors 3 are provided with sludge inlets, and the upper parts of the pipe reactors 3 are provided with sludge outlets.

The pipe reactors 3 are internally provided with spiral fin plates 6 capable of driving fluid to generate spiral motion, and the spiral fin plates 6 are structured to drive the fluid to generate spiral motion such that sludge fully contacts ozone.

The diameters D of the pipe reactors 3 are 150 mm, and the lengths L are 1.2 m.

The Venturi mixer is a special device for efficiently mixing ozone and water. Ozone and water are mixed through the Venturi mixer first; then the mixture enters the pipe reactors 3, after impacting the specially-manufactured spiral fin plates, the mixture of gas and water turns to a complete turbulent current.

The pipe connecting the ozone generator and the pipe reactor 3 is provided with a gas flow meter, and the inlet end of the pump 1 is provided with a basket filter.

The pump 1, ozone generator, jet device 2 and pipe reactors 3 are integrally installed in a case; one case is provided, connected in series through pipes. The case and electric control parts are fixed in a steel frame to form a modular, standard sludge disposal system. The model of the sludge disposal system is DYQ WR150/4-240P8.

Figure 3:
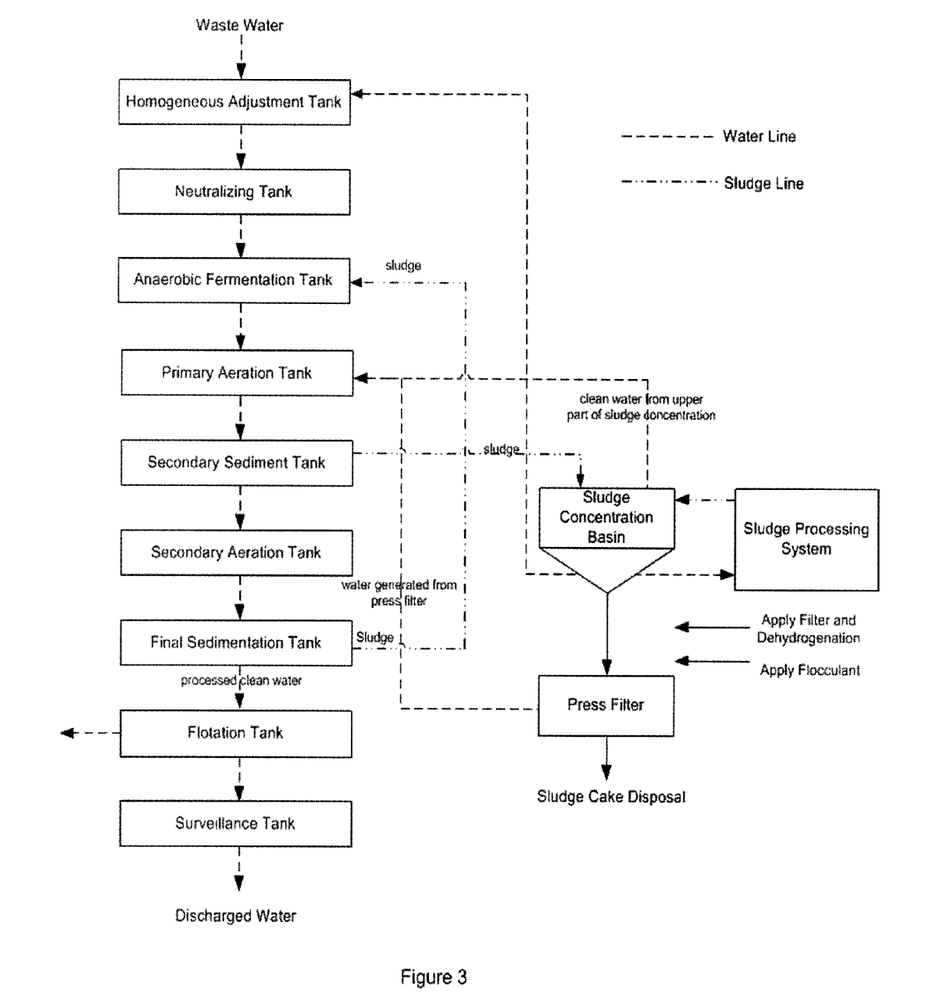
FIG. 3 is a flowchart of a sludge disposal plant of the present invention.

A sludge disposal method of the sludge disposal system of the present invention includes the following steps:

(1) A pipe opening extends to the bottom of a biochemical sludge concentration basin 7; sludge water to be disposed is conveyed to the Venturi mixer through the pump 1 at a certain speed; a lateral inlet of the jet device 2 generates a negative pressure to absorb ozone generated by the ozone generator to perform full mixing and form a mixture of ozone and sludge.

(2) The mixture enters the pipe reactors 3 through pipes; the mixtures sufficiently contact with the catalyst layers in the pipe reactors 3 to perform a redox reaction when catalyzed by catalyst, improving the oxidation efficiency of ozone.

(3) Sludge in the redox reaction product is exhausted via sludge outlets of the pipe reactors 3 and returns back to the sludge concentration basin 7. This process is cycled and then the objective of reducing sludge can be fulfilled.

The pause time of the mixture in the pipe reactors 3 is 10 s-300 s, and the amount of ozone absorbed into the jet device 2 is adjusted through the flow of the pump 1 and a valve on the pipe. The reaction time is determined upon the flow of the pump 1, and the size and number of the pipe reactors 3 connected in series or in parallel, and the effect of sludge reduction is controlled through the ozone dose, the number of the sludge disposal system units and the operation time.

FIG. 3 is a flowchart of a sludge disposal plant of the present invention. Waste water from various places enters a homogeneous adjustment tank via a collection tank or pipe, then a neutralizing tank and followed by an anaerobic fermentation tank; after fermentation, the generated sludge enters the sludge concentration basin; sludge enters a primary aeration tank to perform aerobic aeration; the sludge generated by the aerobic aeration enters a secondary sedimentation tank to be settled; then the generated sludge enters the sludge concentration basin 7, while water generated in the sedimentation tank enters a secondary aeration tank to perform an aerobic biological reaction; the product of the aerobic biological reaction enters the final sedimentation tank, and the sludge deposit generated by the biochemical reaction enters the sludge concentration basin 7; the processed clean water enters a floatation tank to remove flotage. Water entering a surveillance tank can be directly discharged if the discharge standard is met; if the discharge standard such as COD index is not met, measures shall be taken to guide the water back to the aeration tank to perform the biochemical disposal again or back to the homogeneous adjustment tank to perform anaerobic again.

The sludge entering the sludge concentration basin 7 usually has a water content of about 98%; after the flocculant is added into the sludge concentration basin 7, the sludge at the bottom of the sludge concentration basin 7 enters a press filter and then is pressed, filtered and dehydrogenated to form sludge cakes usually with a water content of 75-87%.

The clean water at the upper part of the sludge concentration basin 7 and water generated after pressing and filtering of the sludge are sent to the primary aeration tank via pipes to perform the biochemical aerobic treatment.

Usually, the temperature of the sludge sedimentation tank is 30-40° C. The sludge disposal system of the present invention can work as long as the sludge temperature in the sludge concentration basin 7 is 1-50° C. The temperature of the reaction product of the sludge flowing through the pipe reactors 3 rises a little, but the rise does not affect the system operation.

A test was made by using the sludge concentration basin 7 of a certain chemical fiber company's biochemical sewage disposal device with a wastewater disposal capacity of 20,000 ton each day. The volume of the sludge concentration basin was 80 $m^3$; sludge came from an anaerobic sludge tank, a secondary sedimentation tank and a final sedimentation tank; the sludge feed was about 40 t/h; the supernate flowed back to a segment of aeration tank at a rate of 30 t/h via a supernate backflow tank; the bottom concentrated sludge was dehydrogenated by a dehydrator at a rate of 10 t/h and then the dehydrogenated sludge was transported outside. The sludge cakes contained excessive heavy metals, which are dangerous waste under the surveillance of the Environmental Protection Department.

The sludge disposal system was used to dispose the sludge in the sludge concentration basin 7 for 18 consecutive shifts, 8 h for each shift. After the system was put into use for one day, the odor in the sludge disposal system was reduced. The production operation before and after the use of the system was compared and analyzed, and the contrast results before and after use of the system were obtained, as shown in Table 1 below.

TABLE 1

|  | Sludge feed, $m^3$/shift | Sludge exhausted, $m^3$/shift | Total drug dose, kg/shift | Yield of sludge cake each shift, ton/shift | Water content of the sludge cake |
| --- | --- | --- | --- | --- | --- |
| One month before the test | 297.6 | 58.8 | 19.6 | 9.7 | 85.85% |
| DYQ WR150/4-240P8 put into operation | 237.2 | 54.6 | 16.7 | 6.7 | 85.42% |

As shown in Table 1, the dose of the flocculant used in each shift was reduced from 19.6 kg to 16.7 kg, with a reduction of 14.8%; the yield of the sludge cakes of each shift was reduced from 9.7 ton to 6.7 ton, with a reduction of 30.9%; and the water content of the sludge cakes was a little reduced. The accumulated ozone dose of each 8 h was 1.920 kg. Converted by using the 85.42% water content of the sludge cakes as shown in Table 1, it was obtained that the amount of 100% sludge generated in 8 h was 976.86 kg, while the ratio of the ozone dose to sludge amount was only 0.00197 kg zone/kg sludge amount, which was far lower than the dose of 0.015 kg ozone/kg sludge amount as reported in literatures. The total power consumption of each unit of sludge disposal system was about 20 KW.

Embodiment 2

As shown in FIG. 1 and FIG. 2, the present invention provides a technical solution of a sludge disposal system, characterized in that, the sludge disposal system includes a pump 1 with a flow of 16 $m^3$/h, ozone generators, a jet device 2 and pipe reactors 3, which are connected in turn through pipes, wherein the ozone generator is used for feeding ozone to the pipe reactors 3 to realize sufficient contact between ozone and sludge and solid-liquid separation at the same time.

The ozone generator is internally provided with a 140 L/min oxygen making machine 4 and a 480 g/h ozone machine 5 which are connected though pipes.

The number of the pipe reactors 3 is eight; four pipe reactors 3 form a group and are connected in series, and two groups are connected in parallel.

The inner surfaces of the pipe reactors 3 are coated with catalysts capable of catalyzing ozone into hydroxyl radicals, further improving the oxidation efficiency of ozone.

The lower parts of the pipe reactors 3 are provided with sludge inlets, and the upper parts of the pipe reactors 3 are provided with sludge outlets.

The pipe reactors 3 are internally provided with spiral fin plates 6 capable of driving fluid to generate spiral motion, and the spiral fin plates 6 are structured to drive the fluid to generate spiral motion such that sludge fully contacts ozone.

The diameters D of the pipe reactors 3 are 150 mm, and the lengths L are 1.2 m.

The jet device 2 is a Venturi mixer. The Venturi mixer is a special device for efficiently mixing ozone and water. Ozone and water are primarily mixed through the Venturi mixer first and then respectively enter the pipe reactors 3 to impact the specially-manufactured spiral fin plates, and then the gas and water completely turn to a turbulent current.

The pipe connecting the ozone generator and the pipe reactor 3 is provided with a gas flow meter, and the inlet end of the pump 1 is provided with a basket filter.

The pump 1, ozone generator, jet device 2 and pipe reactors 3 are integrally installed in a case; two cases are provided, connected in series through pipes. The cases and electric control parts are fixed in a steel frame to form a modular, standard sludge disposal system. The model of the sludge disposal system is DYQ WR150/8-480P16.

A sludge disposal method of the sludge disposal system of the present invention is characterized by including the following steps:

the sludge concentration basin 7. This process is cycled and then the objective of reducing sludge can be fulfilled.

The pause time of the mixture in the pipe reactors 3 is 10 s-300 s, and the amount of ozone absorbed into the jet device 2 is adjusted through the flow of the pump 1 and a valve on the pipe. The reaction time is determined upon the flow of the pump 1, and the size and number of the pipe reactors 3 connected in series or in parallel, and the effect of sludge reduction is controlled through the ozone dose, the number of the sludge disposal system units and the operation time.

As shown in FIG. 3, a test was made by using the sludge concentration basin 7 of a certain chemical fiber company's biochemical sewage disposal device with a wastewater disposal capacity of 20,000 ton each day. The volume of the sludge concentration basin 7 was 80 $m^3$; sludge came from an anaerobic sludge tank, a secondary sedimentation tank and a final sedimentation tank; the sludge feed was about 40 t/h; the supernate flowed back to a segment of aeration tank at a rate of 30 t/h via a supernate backflow tank; the bottom concentrated sludge was dehydrogenated by a dehydrator at a rate of 10 t/h and then the dehydrogenated sludge was transported outside. The sludge cakes contained excessive heavy metals, which are dangerous waste under the surveillance of the Environmental Protection Department.

The sludge disposal system was connected with the sludge concentration basin 7, running continuously for 39 days. During testing, the company's sewage disposal and sludge disposal proceeded as usual. After being put into use for 15 days, the system intermittently stopped to press, filter and exhaust sludge at the bottom of the sludge concentration basin 7 each week.

A part of the sludge was sent to the primary aeration tank or homogeneous adjustment tank through pipes to perform secondary biochemical treatment. Operation data obtained one month before testing and data obtained during tests were statistically analyzed, and the following results were obtained, as shown in Table 2.

TABLE 2

|  | Average sludge feed, $m^3$/day | Average sludge exhausted, $m^3$/day | Average total drug dose, kg/day | Average yield of sludge cake, ton/day | Average water content of the sludge cake |
|---|---|---|---|---|---|
| One month before the test | 892.8 | 176.4 | 58.8 | 29.1 | 85.85% |
| Operation of DYQ WR150/8-480P16 in 39 days | 464.4 | 87.6 | 37.2 | 14.4 | 83.16% |
| Reduction rate | 47.98% | 50.34% | 36.73% | 50.52% | 3.13% |

(1) A pipe opening extends to the bottom of a biochemical sludge concentration basin 7; sludge water to be disposed is conveyed to the Venturi mixer through the pump 1 at a certain speed; a lateral inlet of the jet device 2 generates a negative pressure to absorb ozone generated by the ozone generator to perform full mixing and form a mixture of ozone and sludge.

(2) The mixture enters the pipe reactors 3 through pipes; the mixtures sufficiently contact the catalyst layers in the pipe reactors 3 to perform a redox reaction when catalyzed by catalyst, further improving the oxidation efficiency of ozone.

(3) Sludge in the redox reaction product is exhausted via the sludge outlets of the pipe reactors 3 and returns back to During testing, the feed water and overflow water sample of the inlet pipe of the sludge concentration basin 7, and pressing and filtering liquid of the press filter were sampled and analyzed, and results can be seen in table 3.

TABLE 3

| Item | Overflow water sample | Feed water sample | Pressing and filtering water sample |
|---|---|---|---|
| BOD5, mg/L | 104.4 | 7.5 | 116 |
| COD, mg/L | 132.33 | 56.13 | 202.38 |
| B/C | 0.789 | 0.134 | 0.573 |

As shown in Table 3, the COD of water coming from the secondary sedimentation tank was below 60 mg/L, meeting the local requirements for enterprise emission; however, B/C was only 0.134, lower than 0.3, which represents that organisms in the water had poor biodegradability. After sludge-contained sewage was disposed by the DYQ sludge disposal system in the sludge concentration basin 7, COD rose dramatically to 132.33 mg/L, which represents that, after the microorganism cells in the sludge were broken, the biowater in the sludge was released, and organics absorbed by microbial flora flowed into the water body. After the concentrated sludge at the bottom of the sludge concentration basin was pressed and filtered by a volute sludge dehydrator, the COD rose to 202.38 mg/L, which represents that, the biowater and organics in the sludge were further released by the effect of pressure. Through analysis on BOD of the overflow water and pressing and filtering liquid, it was found that, BOD5 respectively rose to 104.4 mg/L and 116 mg/L, while B/C rose dramatically to 0.789 and 0.573, which represents that, the biodegradability of the backflow sewage of the system was greatly improved, aiding digestion of the system on organics.

From Table 2 it is known that, the daily ozone dose was 11.52 kg; the daily yield of 100% sludge was 2424.96 kg; and the ratio of the ozone dose to the sludge amount was 0.00475 kg ozone/kg sludge amount. The sludge-contained sewage delivered by the sludge disposal workshop was reduced from 892.8 $m^3$ to 464.4 $m^3$ by a rate of 47.98%; the sludge entering the volute sludge dehydrator was reduced from 176.4 $m^3$ to 87.6 $m^3$ by a rate of 50.34%. Thus, the power consumption of delivery is greatly reduced. The average daily consumption of flocculant for sludge dehydrogenation was reduced from 58.8 kg to 37.2 kg by a rate of 36.73%, thus greatly reducing cost in the production of raw material. The average daily emission of sludge cakes was reduced from 29.1 ton to 14.4 ton by a rate of 50.52%, greatly reducing the amount of the sludge cakes delivered outside for disposal, and thus saving enterprises' cost in disposal of the sludge cakes.

Embodiment 3

As shown in FIG. 1 and FIG. 2, the present invention provides a technical solution of a sludge disposal system. The sludge disposal system includes a pump 1 with a flow of 2 $m^3$/h, ozone generators, a jet device 2 and pipe reactors 3, which are connected in turn through pipes, wherein the ozone generator is used for feeding ozone to the pipe reactors 3 to realize sufficient contact between ozone and sludge and solid-liquid separation at the same time.

The ozone generator is internally provided with a 5 L/min oxygen making machine 4 and a 30 g/h ozone machine 5 which are connected though pipes.

The number of the pipe reactors 3 is four, while the pipe reactors 3 are connected in parallel or in series through pipes.

The inner surfaces of the pipe reactors 3 are coated with catalysts capable of catalyzing ozone into hydroxyl radicals, further improving the oxidation efficiency of ozone.

The lower parts of the pipe reactors 3 are provided with sludge inlets, and the upper parts of the pipe reactors 3 are provided with sludge outlets.

The pipe reactors 3 are internally provided with spiral fin plates 6 capable of driving fluid to generate spiral motion, and the spiral fin plates 6 are structured to drive the fluid to generate spiral motion such that sludge fully contacts ozone.

The diameters D of the pipe reactors 3 are 100 mm, and the lengths L are 1 m.

The jet device 2 is a Venturi mixer. The Venturi mixer is a special device for efficiently mixing ozone and water. Ozone and water are primarily mixed through the Venturi mixer first; then the mixture enters the pipe reactors 3 to impact the specially-manufactured spiral fin plates, and then the gas and water completely turn to a turbulent current.

The pipe connecting the ozone generator and the pipe reactor 3 is provided with a gas flow meter, and the inlet end of the pump 1 is provided with a basket filter.

The pump 1, ozone generator, jet device 2 and pipe reactors 3 are integrally installed in a case; one case is provided, connected in series through pipes. The case and electric control parts are fixed in a steel frame to form a modular, standard sludge disposal system. The model of the sludge disposal system is DYQ WR100/4-30P2.

A sludge disposal method of the sludge disposal system of the present invention includes the following steps:

(1) A pipe opening extends to the bottom of a biochemical sludge concentration basin 7; sludge water to be disposed is conveyed to the Venturi mixer through the pump 1 at a certain speed; a lateral inlet of the jet device 2 generates a negative pressure to absorb ozone generated by the ozone generator to perform full mixing and form a mixture of ozone and sludge.

(2) The mixture enters the pipe reactors 3 through pipes; the mixtures sufficiently contact the catalyst layers in the pipe reactors 3 to perform a redox reaction when catalyzed by catalyst, further improving the oxidation efficiency of ozone.

(3) Sludge in the redox reaction product is exhausted via the sludge outlets of the pipe reactors 3 and returns back to the sludge concentration basin 7. This process is cycled and then the objective of reducing sludge can be fulfilled.

The pause time of the mixture in the pipe reactors 3 is 10 s-300 s, and the amount of ozone absorbed into the jet device 2 is adjusted through the flow of the pump 1 and a valve on the pipe. The reaction time is determined upon the flow of the pump 1, and the size and number of the pipe reactors 3 connected in series or in parallel, and the effect of sludge reduction is controlled through the ozone dose, the number of the sludge disposal system units and the operation time.

300 L of sludge was sampled from the sludge concentration basin 7 of a certain regeneration papermaking company and circularly disposed for 12 min by using DYQ WR100/4-30P2. The concentrated sludge which was not processed was still malodorous, and the odor of the concentrated sludge disappeared after 12 min disposal. 500 mL concentrated sludge was respectively sampled before and after the disposal and put into measuring cylinders; the measuring cylinders with the sludge were kept aside for 24 h and followed by observation. The volume of the supernate of the concentrated sludge which was not processed was less than 50 ml, and that of the concentrated sludge which was processed was over 300 ml.

Embodiment 4

As shown in FIG. 1 and FIG. 2, the present invention provides a technical solution of a sludge disposal system. The sludge disposal system includes a pump 1 with a flow of 5 $m^3$/h, ozone generators, a jet device 2 and pipe reactors 3, which are connected in turn through pipes, wherein the ozone generator is used for feeding ozone to the pipe reactors 3 to realize sufficient contact between ozone and sludge.

The ozone generator is internally provided with a 10 L/min oxygen making machine 4 and a 60 g/h ozone machine 5 which are connected though pipes.

The number of the pipe reactors 3 is two, and the pipe reactors 3 are connected in parallel or in series through pipes.

The inner surfaces of the pipe reactors 3 are coated with catalysts capable of catalyzing ozone into hydroxyl radicals, further improving the oxidation efficiency of ozone.

The lower parts of the pipe reactors 3 are provided with sludge inlets, and the upper parts of the pipe reactors 3 are provided with sludge outlets.

The pipe reactors 3 are internally provided with spiral fin plates 6 capable of driving fluid to generate spiral motion, and the spiral fin plates 6 are structured to drive the fluid to generate spiral motion such that sludge fully contacts ozone.

The diameters D of the pipe reactors 3 are 150 mm, and the lengths L are 1.2 m.

The jet device 2 is a Venturi mixer. The Venturi mixer is a special device for efficiently mixing ozone and water. Ozone and water are primarily mixed through the Venturi mixer first; then the mixture enters the pipe reactors 3 to impact the specially-manufactured spiral fin plates, and then the gas and water completely turn to a turbulent current.

The pipe connecting the ozone generator and the pipe reactor 3 is provided with a gas flow meter, and the inlet end of the pump 1 is provided with a basket filter.

The pump 1, ozone generator, jet device 2 and pipe reactors 3 are integrally installed in a case; two cases are provided, connected in series through pipes. The cases and electric control parts are fixed in a steel frame to form a modular, standard sludge disposal system. The model of the sludge disposal system is DYQ WR150/2-60P5.

A sludge disposal method of the sludge disposal system of the present invention includes the following steps:

(1) A pipe opening extends to the bottom of a biochemical sludge concentration basin 7; sludge water to be disposed is conveyed to the Venturi mixer through the pump at a certain speed; a lateral inlet of the jet device 2 generates a negative pressure to absorb ozone generated by the ozone generator to perform full mixing and form a mixture of ozone and sludge.

(2) The mixture enters the pipe reactors 3 through pipes; the mixtures sufficiently contact the catalyst layers in the pipe reactors 3 to perform a redox reaction when catalyzed by catalyst, further improving the oxidation efficiency of ozone.

(3) Sludge in the redox reaction product is exhausted via the sludge outlets of the pipe reactors 3 and returns back to the sludge concentration basin 7. This process is cycled and then the objective of reducing sludge can be fulfilled.

The pause time of the mixture in the pipe reactors 3 is 10 s-300 s, and the amount of ozone absorbed into the jet device 2 is adjusted through the flow of the pump 1 and a valve on the pipe. The reaction time is determined upon the flow of the pump 1, and the size and number of the pipe reactors 3 connected in series or in parallel, and the effect of sludge reduction is controlled through the ozone dose, the number of the sludge disposal system units and the operation time.

The sludge settled by the papermaking wastewater of a certain papermaking company was processed. The sludge sedimentation tank of the company was 3.9 m long, 2.5 m wide and 3 m deep. The sludge came from the wastewater precipitate of the papermaking workshop and a part of biochemical sludge. 300 m$^3$ wastewater was exhausted into sedimentation tank each day and pressed by a band-type press filter to generate 3-4 ton of sludge cakes, and the sludge cakes were delivered outside, with odors nearby. A system, DYQ WR150/2-60P5, was placed next to the sludge sedimentation tank, with the inlet of the pump 1 extending to the bottom of the tank. The sludge entered the sludge disposal system and then returned back to the tank via pipes. After circular disposal for one day, the odors disappeared. After the disposal, the majority of the precipitate was recycled as pulp through special treatment.

Embodiment 5

As shown in FIG. 1 and FIG. 2, the present invention provides a technical solution of a sludge disposal system. The sludge disposal system includes a pump 1 with a flow of 12 m$^3$/h, ozone generators, a jet device 2 and pipe reactors 3, which are connected in turn through pipes, wherein the ozone generator is used for feeding ozone to the pipe reactors 3 to realize sufficient contact between ozone and sludge and solid-liquid separation at the same time.

The ozone generator is internally provided with a 120 L/min oxygen making machine 4 and a 400 g/h ozone machine 5 which are connected though pipes.

The number of the pipe reactors 3 is four, and the pipe reactors 3 are connected in parallel or in series through pipes.

The inner surfaces of the pipe reactors 3 are coated with catalysts capable of catalyzing ozone into hydroxyl radicals, further improving the oxidation efficiency of ozone.

The lower parts of the pipe reactors 3 are provided with sludge inlets, and the upper parts of the pipe reactors 3 are provided with sludge outlets.

The pipe reactors 3 are internally provided with spiral fin plates 6 capable of driving fluid to generate spiral motion, and the spiral fin plates 6 are structured to drive the fluid to generate spiral motion such that sludge fully contacts ozone.

The diameters D of the pipe reactors 3 are 200 mm, and the lengths L are 1.5 m.

The jet device 2 is a Venturi mixer. The Venturi mixer is a special device for efficiently mixing ozone and water. Ozone and water are primarily mixed through the Venturi mixer first; then the mixture enters the pipe reactors 3 to impact the specially-manufactured spiral fin plates, and then the gas and water completely turn to a turbulent current.

The pipe connecting the ozone generator and the pipe reactor 3 is provided with a gas flow meter, and the inlet end of the pump 1 is provided with a basket filter.

The pump 1, ozone generator, jet device 2 and pipe reactors 3 are integrally installed in a case; four cases are provided, connected in series through pipes. The cases and electric control parts are fixed in a steel frame to form a modular, standard sludge disposal system. The model of the sludge disposal system is DYQ WR200/4-400P12.

A sludge disposal method of the sludge disposal system of the present invention includes the following steps:

(1) A pipe opening extends to the bottom of a biochemical sludge concentration basin 7; sludge water to be disposed is conveyed to the Venturi mixer through the pump 1 at a certain speed; a lateral inlet of the jet device 2 generates a negative pressure to absorb ozone generated by the ozone generator to perform full mixing and form a mixture of ozone and sludge.

(2) The mixture enters the pipe reactors 3 through pipes; the mixtures sufficiently contact the catalyst layers in the pipe reactors 3 to perform a redox reaction when catalyzed by catalyst, further improving the oxidation efficiency of ozone.

(3) Sludge in the redox reaction product is exhausted via the sludge outlets of the pipe reactors 3 and returns back to the sludge concentration basin 7. This process is cycled and then the objective of reducing sludge can be fulfilled.

The pause time of the mixture in the pipe reactors 3 is 10 s-300 s, and the amount of ozone absorbed into the jet device 2 is adjusted through the flow of the pump 1 and a valve on the pipe. The reaction time is determined upon the flow of the pump 1, and the size and number of the pipe reactors 3 connected in series or in parallel, and the effect of sludge reduction is controlled through the ozone dose, the number of the sludge disposal system units and the operation time.

The system of the present invention operates stably, and is highly reliable, simple and feasible. The present invention fulfills the objective of reducing sludge by using an extremely low ozone dose of 0.00197-0.00475 kg/kg sludge amount. In a sludge disposal plant with a daily sludge cake of 40 ton, an ozone amount of 0.6567 kg-1.583 kg/h can realize reduction of sludge, and one 1-2 kg/h ozone generator configured can meet technical requirements.

The inner structures of the pipe reactors 3 drive the fluid to generate spiral motion such that the sludge fully contacts ozone, and the pipe reactors 3 are internally coated with the catalyst, thus further improving the oxidation efficiency of ozone.

The present invention realizes modular production of the sludge-reduction disposal system; it does not need modification on the current sludge system, and the installation and operation of the sludge-reduction disposal system can be executed without shutdown; and the present invention does not affect the original continuous sludge concentration and dehydrogenation; and it eliminates odors generated in the sludge disposal system and during export of the sludge cakes, lowers down the water content of the sludge cakes, reduces dose of flocculant, lowers down energy consumption during production, and reduces the total sludge amount discharged from the system.

The basic principle, main characteristics and advantages of the present invention are described above. Those skilled in this field shall understand that the present invention is not limited by the above embodiments; the embodiments and the description only explain the principle of the present invention; based on the concept and scope of the present invention, various changes and improvements can be made. The protective scope of the present invention is defined by the attached Claims, Description and equivalents.

What is claimed is:

1. A sludge disposal system, comprising: a pump, ozone generators, a jet device and pipe reactors,
    wherein the pump, the ozone generators, the jet device and pipe reactors are connected in turn through pipes;
    wherein the ozone generator is used for feeding ozone to the pipe reactor to realize sufficient contact between ozone and sludge;
    wherein the ozone generator is internally provided with an oxygen making machine and an ozone machine,
    wherein the oxygen making machine and the ozone machine are connected though pipes;
    wherein the number of the pipe reactors is two or above, wherein the pipe reactors are connected in parallel or in series through pipes;
    wherein the inner surfaces of the pipe reactors are coated with a catalyst layer for improving oxidation of ozone to sludge;
    wherein the lower parts of the pipe reactors are provided with sludge inlets, and the upper parts of the pipe reactors are provided with sludge outlets.

2. The sludge disposal system of claim 1, wherein the diameters D of the pipe reactors are 32 mm ≤D ≤500 mm, and the lengths L are 0,2 m ≤L ≤10 m.

3. The sludge disposal system of claim 2, wherein the pipe reactors are internally provided with spiral fin plates which drive fluid to generate spiral motion; wherein the diameters D of the pipe reactors are 100 mm ≤D ≤350 mm, and the length L are 0.3 m L ≤3 m.

4. The sludge disposal system of claim 1, wherein the diameters D of the pipe reactors are 200 mm, and the lengths L are 1.5 m.

5. The sludge disposal system of claim 1, wherein the jet device is a Venturi mixer.

6. The sludge disposal system of claim 5, wherein the pipe connecting the ozone generator and the pipe reactor is provided with a gas flow meter, and the inlet end of the pump is provided with a basket filter.

7. The sludge disposal system of claim 1, wherein the pump, ozone generator, jet device and pipe reactors are integrally installed in one or more cases, wherein the cases are connected in series through pipes.

8. A sludge disposal method of the sludge disposal system of claim 1, comprising the following steps:
    (1) Sludge water to be disposed is conveyed to the jet device through the pump at a certain speed; the jet device generates a negative pressure to absorb ozone generated by the ozone generator to form a mixture of ozone and sludge;
    (2) The mixture enters the pipe reactors through pipes; the mixtures sufficiently contact the catalyst layers in the pipe reactors to perform a redox reaction when catalyzed by catalyst;
    (3) Sludge in the redox reaction product is exhausted via the sludge outlets of the pipe reactors.

9. The sludge disposal method of claim 8, wherein the pause time of the mixture in the pipe reactors is 10 s-300 s, and the amount of ozone absorbed into the jet device is adjusted through the flow of the pump and a valve on the pipe.

10. The sludge disposal system of claim 2, wherein the pump, ozone generator, jet device and pipe reactors are integrally installed in one or more cases, wherein the cases are connected in series through pipes.

11. The sludge disposal system of claim 3, wherein the pump, ozone generator, jet device and pipe reactors are integrally installed in one or more cases, wherein the cases are connected in series through pipes.

12. The sludge disposal system of claim 4, wherein the pump, ozone generator, jet device and pipe reactors are integrally installed in one or more cases, wherein the cases are connected in series through pipes.

13. The sludge disposal system of claim 5, wherein the pump, ozone generator, jet device and pipe reactors are integrally installed in one or more cases, wherein the cases are connected in series through pipes.

14. The sludge disposal system of claim 6, wherein the pump, ozone generator, jet device and pipe reactors are integrally installed in one or more cases, wherein the cases are connected in series through pipes.

* * * * *